Dec. 4, 1951 R. L. GATES 2,577,654
VENT VALVE
Filed July 5, 1946

INVENTOR.
RICHARD L. GATES
BY

Patented Dec. 4, 1951

2,577,654

UNITED STATES PATENT OFFICE 2,577,654

VENT VALVE

Richard L. Gates, Dayton, Ohio, assignor to Curtis Automotive Devices, Inc., Dayton, Ohio, a corporation of Ohio Application July 5, 1946, Serial No. 681,577

4 Claims. (Cl. 251—137)

1

This invention relates to an inexpensive spring-loaded valve adapted to be readily opened by depressing a head portion of the valve. Specifically the invention deals with a spring loaded vent valve especially adapted for purging air from hot water radiators or the like which valve is composed of a hollow screw plug body and a solid spring loaded valve member slidable in the body between opened and closed positions and coacting therewith to provide a drain or purge passageway therethrough.

According to this invention a hollow open-ended screw plug body or housing slidably receives a solid valve member therein. One end of the valve member carries a sealing ring for closing the adjacent end of the body or housing. The other end of the valve member has an enlarged head thereon for closing the adjacent end of the housing whenever the seal member is unseated to open the other end of the housing. A spring acts on the head of the valve in the housing to urge the seal ring into closed position and to urge the head out of the housing. A drain outlet is provided intermediate the ends of the housing and in advance of the seated position for the valve head so that fluid can drain around the valve through the housing to the outlet without flowing past the valve head.

A feature of the invention resides in the utilization of inexpensive screw machine parts that are readily assembled to provide a spring loaded valve at very low cost. The valve parts are inexpensively assembled by a simple pressing operation and are held in assembled relation by the sealing ring carried on the valve. This sealing ring in turn is easily slipped over an end of the valve into a groove and the end of the valve is then pressed to flatten it for providing a shoulder that extends laterally beyond the diameter of the valve body to back up the seal ring and prevent removal of the seal ring from the groove. In the event that the seal ring deteriorates this shoulder will still hold the parts in assembled relation.

It is then an object of the invention to provide a spring loaded vent valve composed of cheaply formed screw machine parts held in readily assembled position by an inexpensive pressing operation.

Another object of the invention is to provide a vent or purge valve especially adapted for hot water radiators wherein a solid valve member fits loosely in a tubular housing and has a seal ring at one end thereof for closing the adjacent end of the housing, together with an enlarged head at the other end thereof for closing the adjacent end of the housing when the head is depressed to unseat the seal ring.

A still further object of this invention is to provide a valve wherein a solid spring loaded member is slidable in a hollow open-ended housing to alternately close the opposite ends of the housing and wherein the housing has a laterally extending drain outlet intermediate the ends thereof for accommodating drainage out of the housing whenever one end of the housing is opened.

A further and specific object of the invention is to provide a vent valve adapted for purging air from radiators or the like wherein a headed externally threaded hollow plug slidably mounts a solid valve and coacts therewith to provide a drain passageway connecting the end of the plug with a radial outlet in the plug.

A further object of the invention is to reduce the cost and increase the ease of operation of vent valves for purging air from radiators or the like.

Other and further objects of the invention will be apparent to those skilled in the art from the following detailed description of the annexed sheet of drawings which, by way of preferred example, illustrates one embodiment of the invention.

Figure 1:
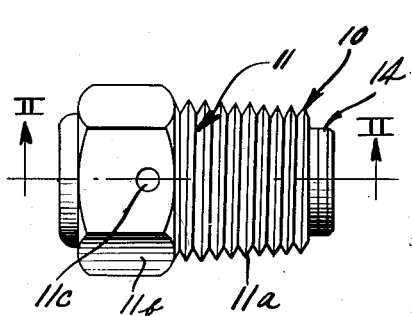
Figure 1 is a side elevational view of a vent valve according to this invention illustrating the valve in closed position.

The valve 10 is composed of a hollow open-ended plug-like body or housing 11, a solid valve 12, a spring 13, and a resiliently deformable seal ring 14 composed of rubber, fiber, plastic, or the like. The housing 11 has an externally threaded tapered shank portion 11a for threaded insertion in the threaded port of a radiator or other part to be selectively vented. A polygonal head 11b is provided on the large end of the tapered shank 11a and a radially extending bore 11c is formed through the polygonal head. The small end of the shank 11a has a beveled end face 11d providing a valve seat.

Three stepped coaxial bores define the hollow interior of the body 11. A small bore 11e extends inwardly from the valve seat 11d to a shoulder 11f at the junction between the shank 11a and head 11b. A larger and middle bore 11g extends from the outer end of the shoulder 11f to a second shoulder 11h. This shoulder 11h is inwardly from the end of the head 11b. A larger bore 11i extends from the outer end of the shoulder 11h through the end face of the head 11b.

Figure 3:
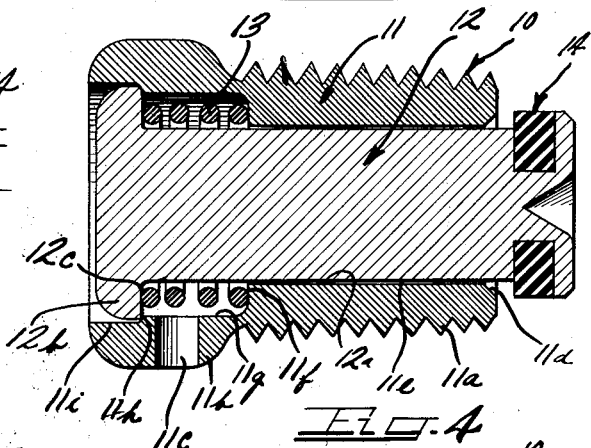
Figure 3 is a view similar to Fig. 2 but showing the valve in opened position.

The valve member 12 is composed of a generally cylindrical solid body with a cylindrical shank portion 12a of smaller diameter than the bore 11e of the housing 11 and with an enlarged cylindrical head 12b on one end of the shank 12a and having a diameter slightly smaller than the diameter of the bore 11i of the housing 11. A shoulder 12c is provided between the shank portion 12a and the head 12b and as shown in Fig. 3 is adapted to thrust against the shoulder 11h of the housing 11 to close the bore 11g.

The end of the shank 12a opposite the end containing the head 12b is initially lathe turned by a screw machine type lathe to provide a reduced diameter cylindrical portion 12d bounded on one side by a radial shoulder 12e and on the other side by an inclined shoulder 12h diverging to about the same diameter as the shank 12a.

Figure 2:
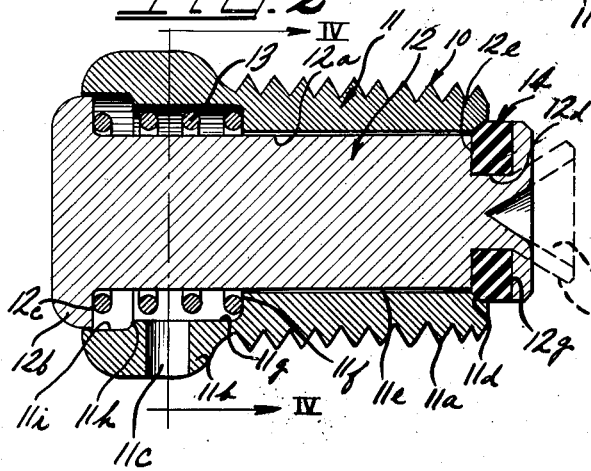
Figure 2 is a longitudinal cross sectional view taken along the line II—II of Fig. 1 illustrating the valve on a larger scale and showing in dotted lines the original form of the end of the valve.
Figure 4:
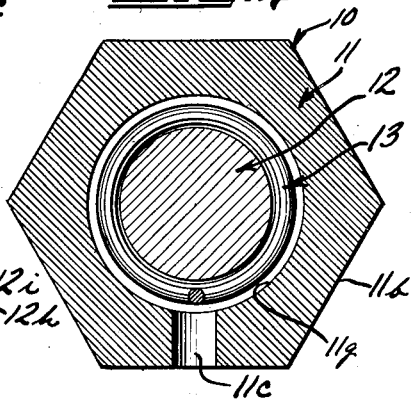
Figure 4 is a transverse cross sectional view taken along the line IV—IV of Fig. 2.

A pointed drill coaxial with the valve 12 forms a conical hole 12i in the reduced diameter end of the valve. This hole or recess 12i can be formed on the same screw machine that forms the contour of the valve. The apex or point of the recess 12i is selected to lie within the reduced diameter portion 12d and to regulate the thickness of the sloping portion 12h so that bending will occur at a predisposed point when the end of the valve is pressed. As shown in Fig. 2 the sealing ring 14 is disposed on the reduced diameter portion 12d of the valve against the shoulder 12e. The ring 14 has an external diameter larger than the diameter of the shank 12a so that the ring projects radially beyond the shank. The hole in the ring is sized for snugly fitting on the reduced diameter portion 12d of the valve. This hole can be stretched over the divergent end of the shoulder portion 12h shown in dotted lines. When the valve 12 is inserted through the spring 13 and housing 11 the sealing ring 14 is seated on the valve and the shoulder portion 12h projecting beyond the sealing washer is pressed to flatten it and provide a flattened radially extending shoulder 12g backing up the sealing ring 14 and projecting radially to a diameter greater than the diameter of the shank 12a. This shoulder 12g therefore cannot fit in the bore 11e and is effective to retain the valve in the housing even in the event of total disintegration of the sealing ring 14. The shoulder backs up the seating face of the sealing ring as illustrated in Fig. 2 when the ring is seated on the face 11d of the housing to prevent unseating of the ring out of the flat sided groove afforded by the pressed or flattened valve.

The spring 13 is seated in the bore 11g of the housing and is compressed between the shoulders 11f and 12c. The spring expands to urge the head 12b of the valve out of the headed end of the housing and seats the ring 14 against the valve seat 11d at the other end of the housing. Under these conditions the valve is closed as shown in Fig. 2.

When the head 12b of the valve is manually depressed into the head 11b of the housing, the spring 13 is compressed but the washer 14 is moved away from the seating face 11d to open up a passageway through the housing around the shank 12a into the bore 11g. Under these conditions the shoulder 12c of the head 12b is seated against the shoulder 11h of the housing to close the outer end of the bore 11g. The fluid can then drain through the radially extending outlet 11c without discharging through the axial opening in the valve body. When the valve head is released, the spring 13 automatically moves the valve into its closed position as shown in Fig. 2.

Figure 5:
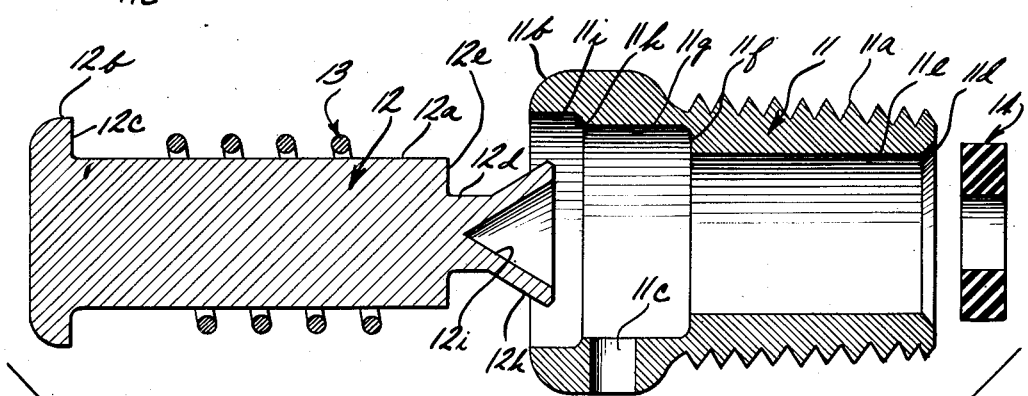
Figure 5 is an exploded longitudinal cross sectional view of the parts forming the valve of this invention and illustrating the same in their relative positions for assembly.

The valve parts are inexpensively made on screw machines and are assembled as illustrated in Fig. 5 by slipping the spring 13 on the shank 12a of the valve 12, by inserting the valve and spring assembly into the housing 11, by stretching the sealing ring or washer 14 over the shoulder 12h of the valve body onto the reduced diameter portion 12d and by pressing the end of the valve to bend the shoulder 12h into flat form for forming the radial shoulder 12g.

As shown in Fig. 2 the beveled valve seat 11d coacts with the sealing ring 14 to axially center the valve 12 in the housing 11. Metal to metal contact between the housing and valve is thereby avoided.

The external threads on the shank portion 11a of the housing are preferably tapered from the head end 11b to the valve seat end 11d so that the housing can be threaded into sealed engagement in an internally threaded boss.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A valve comprising a body having an exteriorly threaded shank and a polygonal head at one end of the shank, said body having three coaxial stepped bores therethrough, shoulders between said bores, the smallest of said bores extending through the shank of the body, the largest of said bores extending inwardly from the head of the valve body and the middle bore connecting the small and large bores in the head of the body, a drain outlet port extending radially through said head from said middle bore, a valve having a shank portion fitting freely in the smallest of said bores and projecting through the middle bore, a head on one end of the shank portion of said valve fitting freely in the largest of said bores and adapted to engage the shoulder between the largest bore and the middle bore, a spring surrounding the shank of said valve bottomed at one end on the shoulder between the smallest bore and the middle bore and at the other end on the head of the valve, a sealing ring of larger diameter than said shank carried by the other end portion of the shank and held by said spring against the end of the shank portion of the housing, and an integral shoulder portion on the shank of the valve extending radially to substantially the same diameter as the sealing ring for backing up the sealing ring.

2. The method of making a valve which comprises machining a cylindrical rod member to form a reduced diameter portion bounded on one side by a radially extending shoulder and on the other side by a diverging inclined shoulder, drilling an end face of the member to form a conical recess having an apex at the radial center of the reduced diameter portion and intermediate said shoulders, said recess and said inclined shoulder cooperating to define therebetween a bendable frusto-conical terminal wall formed integrally with said reduced diameter portion, stretching a resilient ring over the terminal wall onto the reduced diameter portion to bottom against said radial shoulder, and bending the recessed end face of the member to radially spread the terminal wall and form an integral radial shoulder snugly engaging the ring face and extending to the periphery of the ring to reinforce the entire face thereof.

3. In the method of making a valve, the steps which comprise lathe turning a cylindrical member to form a reduced diameter portion bounded on one side by a radial shoulder and on the other side by a diverging inclined shoulder extending to the end face of the member, drilling the end face of the member to provide a conical recess therein having its apex coaxial with the reduced diameter portion and midway between said shoulders, said recess and said inclined shoulder defining therebetween a reduced thickness frusto-conical flange formed integrally with said cylindrical member, stretching a flat-faced ring of resilient material having a normal diameter greater than the diameter of said member over the frusto-conical flange onto said reduced diameter portion, and flattening the end face of the member to bend said flange behind said ring to provide an integral radial shoulder extending to the periphery of said ring to reinforce the entire rear face thereof.

4. A valve comprising a body having an axial bore for fluid flow therethrough and a sealing end face at one end of said bore, said body also having an outer counterbore and an inner counterbore at the other end of said bore defining outer and inner interior annular shoulders respectively, a valving element extending through said bore and said counterbores for reciprocatory movement therein and cooperating with said bores to define therebetween coaxial fluid flow passages, said element having an enlarged head for abutting the outer of said interior shoulders and a peripheral groove spaced from said head, an annular seal ring seated in said groove for abutting said body end face, a side delivery fluid outlet in the inner of said counterbores communicating with the coaxial passages, and a spring confined between the inner of said shoulders and the enlarged head of said element for normally biasing said seal ring against said sealing end face and said enlarged head from the outer of said shoulders, said element being movable in said bore and counterbores against the action of said spring to space said seal ring from said sealing end face to establish fluid flow through said coaxial passages to said outlet, and said head being simultaneously seated against said outer interior shoulder to prevent fluid leakage from said body through the outer of said counterbores.

RICHARD L. GATES.

REFERENCES CITED

The following references are of record in the file of this patent:

UNITED STATES PATENTS

| Number | Name | Date |
|---|---|---|
| 1,235,645 | Blatz | Aug. 7, 1917 |
| 1,238,926 | Long | Sept. 4, 1917 |
| 1,302,829 | Muir | May 6, 1919 |
| 1,378,426 | Sackett | May 17, 1921 |
| 1,462,263 | Chaney | July 17, 1923 |
| 1,551,439 | Stoms | Aug. 25, 1925 |
| 1,682,154 | Van House | Aug. 28, 1928 |
| 2,408,541 | Wilson | Oct. 1, 1946 |

FOREIGN PATENTS

| Number | Country | Date |
|---|---|---|
| 758,332 | France | of 1933 |